United States Patent
Ream

[11] Patent Number: 5,556,137
[45] Date of Patent: Sep. 17, 1996

[54] FLUID CONNECTOR ASSEMBLY

[75] Inventor: Martin Ream, Ortonville, Mich.

[73] Assignee: ITT Automotive, Inc., Auburn Hills, Mich.

[21] Appl. No.: 331,681

[22] Filed: Oct. 31, 1994

[51] Int. Cl.$^6$ .................................................. F16L 35/00
[52] U.S. Cl. .......................... 285/26; 285/137.1; 285/423; 285/177
[58] Field of Search ............................... 285/25, 26, 28, 285/29, 137.1, 177, 423; 248/68.1

[56] References Cited

U.S. PATENT DOCUMENTS

| | | | |
|---|---|---|---|
| 3,964,707 | 6/1976 | Lewis | 248/68.1 X |
| 4,479,668 | 10/1984 | Jacquet | 285/137.1 |
| 4,541,658 | 7/1985 | Bartholomew | |
| 4,601,497 | 7/1986 | Bartholomew | |
| 4,681,351 | 7/1987 | Bartholomew | |
| 4,893,845 | 1/1990 | Bartholomew | |
| 5,170,841 | 12/1992 | Briet | 285/137.1 X |
| 5,178,208 | 1/1993 | Briet | 285/137.1 X |
| 5,180,006 | 1/1993 | Marsais et al. | 285/137.1 X |
| 5,280,964 | 1/1994 | Walker et al. | 285/137.1 X |

FOREIGN PATENT DOCUMENTS

| | | | |
|---|---|---|---|
| 603032 | 6/1994 | European Pat. Off. | 285/137.1 |
| 2250078 | 5/1992 | United Kingdom | 285/137.1 |

*Primary Examiner*—Dave W. Arola
*Attorney, Agent, or Firm*—Robert P. Seitter; J. Gordon Lewis

[57] ABSTRACT

A fluid connector assembly having a spacer for positioning at least two quick connect conduit members in a predetermined position with respect to one another in order to reduce assembly time and ease serviceability. The spacer provides at least two means for receiving the conduit members wherein each of the receiving means has a longitudinal axis that is substantially parallel with respect to one another. The spacer also provides a rigid connecting means to connect the receiving means and insure that the longitudinal axis of the receiving means are substantially parallel as well as having the receiving means radially spaced and axially offset from one another. By having the receiving means the same length and having the receiving means axially offset, the spacer insures that the tubular conduit members can only be assembled to a heater core in a proper orientation. The conduit members provide a quick connect means for rotatably and releasably retaining the tubular member within the conduit members. The receiving means provide a detent means for releasably retaining the conduit members within the receiving means and allowing the conduit members to be quickly assembled and disassembled into the spacer. Each of the conduit members provides for a 90° elbow or bend for allowing angular adjustment of the second end of the tubular member with respect to the first end.

20 Claims, 2 Drawing Sheets

FLUID CONNECTOR ASSEMBLY

FIELD OF THE INVENTION

The present invention relates to fluid connector assemblies, and more particularly, to a spacer that positions and retains quick connect conduit members in a predetermined position to reduce assembly time and ease serviceability of the quick connect conduit members with respect to a heater core of a motor vehicle.

BACKGROUND OF THE INVENTION

In general, all automobiles have tubular connections and fittings for transferring fluid from one particular section or location of an automobile to another particular section or location. Such fittings and connections commonly use rubber tubular hoses that are connected to metallic tubings or ports by hose clamps. Such hose clamps are difficult and timely to assemble as well as creating similar problems for serviceability.

Hose clamp connections are often utilized in automobile heaters as heated fluid is passed through an inlet tube of a heater core and exits an adjacent outlet tube of the heater core. Thus, the heated fluid is communicated to and from the heater core through a series of tubular members which circulate the fluid through the engine coolant system. Many quick connects have been developed to reduce assembly time and ease serviceability by replacing the hose clamps with quick connect conduit members. Unfortunately, when the quick connect conduit members are both disconnected from the inlet and outlet of the heater core, the quick connect conduit members may be mistakenly assembled or reassembled to the wrong ports of the heater core. Thus, it would be desirable to provide quick connect conduit members that could only be assembled to the heater core in a proper predetermined configuration.

In addition, differences in fluid conduit lengths, angular positions and space requirements provided in different vehicle models, may create the need for certain adapters and extenders to be utilized. Thus, it would be desirable to provide a fluid connector assembly that would allow for angular rotation of the fluid conduits so as to provide a multitude of routing configurations as well as being adapted to adjust to various space requirements and geometric configurations.

SUMMARY OF THE INVENTION

The present invention solves the above-mentioned shortcomings by providing a fluid connector assembly having a spacer for positioning at least two quick connect conduit members in a predetermined position with respect to one another. The spacer provides at least two means for receiving the conduit members wherein each of the receiving means has a longitudinal axis that is substantially parallel with respect to one another. The spacer also provides a rigid connecting means to connect the receiving means and insure that the longitudinal axes of the receiving means are substantially parallel as well as having the receiving means radially spaced and axially off-set from one another. By having the receiving means the same length and by having the receiving means axially off-set, the spacer insures that the tubular conduit members can only be assembled to the heater core in the proper orientation.

Each of the conduit members provides a first end and a second end having a central passageway extending therebetween for the passage of fluid. The first ends of the conduit members have a quick connect means for rotatably and releasably retaining a tubular member within the conduit members. The second ends of the tubular members have a non-quick connect means for fixedly attaching a flexible tubular member thereto. Thus, the quick connect means of the first end can be easily and quickly disconnected from the tubular ports of the heater core thus allowing for the non-quick connect means to remain fixedly attached to the flexible tubular members.

Each of the receiving means in the spacer provides a detent means for releasably retaining the conduit members within the receiving means. The detent means provides an annular recess formed within the receiving means. The conduit members provide a complimentary surface wherein the complimentary surface cooperatively engages the annular recess to retain the conduit members within the receiving means. The detent means allows each of the conduit members to be quickly assembled and disassembled from the receiving means of the spacer.

The annular configuration of the receiving means and of the conduit members allows the conduit members to rotate relative to the receiving means. The conduit members each provide a 90° elbow or bend with respect to the first end and the second end of the conduit member. The 90° bend allows for angular adjustment of the second end of the tubular member by rotating the conduit member within the receiving means. An annular O-ring is also provided to enhance the rotatability of the conduit members within the receiving means as well as eliminate contamination from passing through the receiving means. The O-ring also helps to secure the fit of the conduit members within the receiving means.

To this end, the objects of the present invention are to provide a new and improved quick connect fluid connector assembly that decreases assembly time and eases serviceability by providing quick connect conduit members that can only be assembled in a predetermined configuration; to provide a new and improved fluid connector assembly that provides for the rotational adjustment of the fluid conduit members; to provide a new and improved fluid connector assembly that provides a quick and simple manner in which to assemble the conduit members to the spacer.

DESCRIPTION OF THE PREFERRED EMBODIMENT

Figure 1:
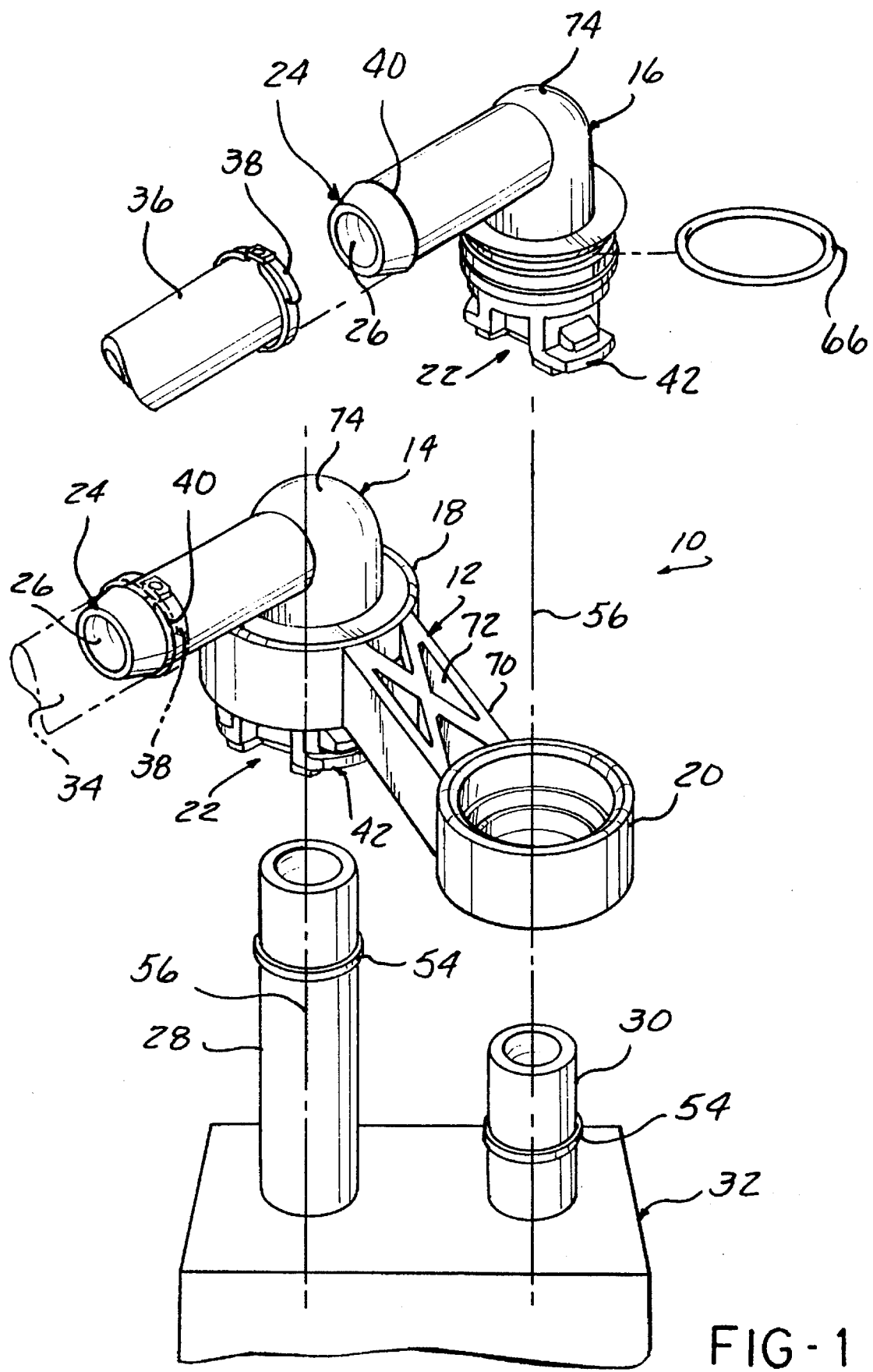
FIG. 1 is a perspective view of the present invention showing a conduit member and an o-ring exploded from the spacer.

As seen in FIG. 1, the present invention provides for a fluid connector assembly 10 having a spacer 12 for retaining a pair of conduit members 14, 16 in a predetermined position. Each of the conduit members 14, 16 are received and rotatably retained by a pair of hollow cylindrical members 18, 20, respectively, that are connected by a rigid connecting means of the spacer 12. Each of the conduit members 14, 16 have a first end 22 and a second end 24 and a passageway 26 extending therebetween for the passage of fluid. The first end 22 of the conduit members 14, 16 has a quick connect means for releasably engaging the tubular ports 28, 30, respectively, of a heater core 32 of a motor vehicle (not shown). The smaller tubular port 30 of the heater core 32 receives incoming heated fluid and the other larger tubular port 28 of the heater core 32 provides an outlet for the heated fluid. The diameters of the conduit members 14, 16 have corresponding sizes as the tubular ports 28, 30 of the heater core 32 so as to provide pressure at the smaller inlet tubular port 28 while relieving pressure at the larger outlet tubular port 30. The two conduit members 14, 16 communicate and direct the heated fluid between the heater core tubular ports 28, 30 and a pair of flexible tubular hoses 34, 36 that communicate and direct the heated fluid to the cooling system (not shown) of the motor vehicle. Each of the flexible tubular hoses 34, 36 are secured to the second end 24 of the conduit members 14, 16 via conventional hose clamps 38. The second end 24 of the conduit members 14, 16 provide a shoulder 40 by which the hose clamps 38 are prevented from sliding over once the hose clamps 38 have been tightened to secure the flexible hoses 34, 36 to the conduit members 14, 16.

Figure 2:
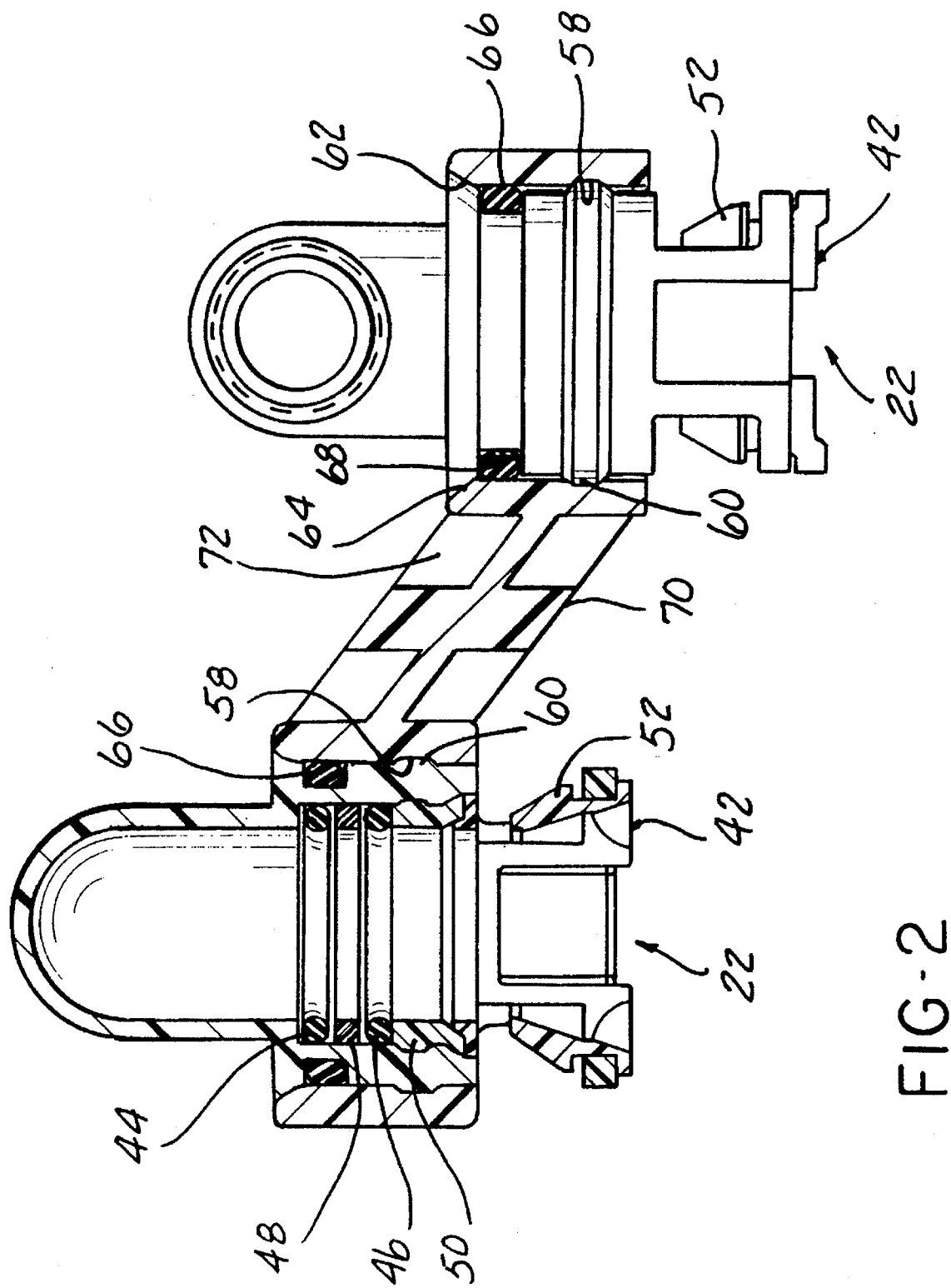
FIG. 2 is a front view with certain portions sectioned showing the internal configuration of the conduit members.

To decrease assembly time and enhance serviceability, each of the conduit members 14, 16 provides a quick connect means at the first end 22 of the conduit members 14, 16 to connect the conduit members 14, 16 to the tubular ports 28, 30 of the heater core 32. As seen in FIGS. 1 and 2, each of the quick connect means provides conventional quick connectors 42 which comprise a top and a bottom flexible O-ring 44, 46, respectively, separated by a nylon spacer 48 within the internal surface of the conduit members 14, 16. A nylon top hat 50 is seated along the inside surface of the conduit members 14, 16 adjacent the bottom flexible O-ring 46. A retainer assembly 52 is then provided in the conduit members 14, 16 to retain an annular rib 54 which extends radially outward from the circumference of the tubular ports 28, 30 of the heater core 32. The tubular ports 28, 30 of the heater core 32 are retained by the quick connectors 42 of the conduit members 14, 16. The O-rings 44, 46 seal the tubular ports 28, 30 of the heater core 32 from the conduit members 14, 16 so as to provide a fluid tight seal.

To position the conduit members 14, 16 in a predetermined position, the conduit members 14, 16 are received and retained by the pair of hollow cylindrical members 18, 20 of the spacer 12. Each of the cylindrical members 18, 20 have a longitudinal axis 56, and each of the cylindrical members 18, 20 have substantially the same configuration except that one of the hollow cylindrical members 18 has a larger diameter than the second cylindrical member 20 so as to accommodate the larger diameter conduit member 14, as previously noted. A detent means allows the conduit members 14, 16 to be easily assembled and disassembled within the cylindrical members 18, 20 of the spacer 12. The detent means provides an annular recess 58 within the inside surface of each cylindrical member 18, 20, and each conduit member 14, 16 provides a complimentary surface or ring 60 extending radially outward from the outer surface of the conduit member 14, 16. The complimentary surface 60 of the conduit member 14, 16 provides an interference fit with respect to the internal surface of the cylindrical member 18, 20. When the complimentary surface 60 engages the annular recess 58 of the cylindrical member 18, 20, the complimentary surface 60 relaxes and engages the annular recess 58. Thus, a predetermined amount of force is required to assemble and disassemble the conduit members 14, 16 from the cylindrical members 18, 20.

To prevent the conduit members 14, 16 from being assembled into the cylindrical members 18, 20 incorrectly, a chamfer or tapered edge 62 is also provided at one end of the cylindrical members 18, 20. A complimentary surface or chamfered edge 64 is provided on the conduit members 14, 16 so as to engage the chamfered edge 62 of the cylindrical member 18, 20 thus providing a flush surface along the top of the cylindrical member 18, 20. These complimentary surfaces 62, 64 help to ensure that the conduit members 14, 16 can only be assembled into the cylindrical members 18, 20 in the proper axial direction. The detent means has also been placed beyond the half way point of the cylindrical member 18, 20 so as to indicate that the conduit member 14, 16 is being assembled in the proper direction.

To prevent the flow of contamination between the internal surface of the cylindrical member 18, 20 and the outer surface of the conduit member 14, 16, a flexible O-ring 66 is disposed within an annular recess 68 provided in the outside surface of each of the conduit members 14, 16. The O-ring 66 seals the outside surface of the conduit members 14, 16 with respect to the inside surface of the cylindrical member 18, 20. The O-ring 66 also helps to secure any play which may result from the detent means.

To position the conduit members 14, 16 in a predetermined position, the cylindrical members 18, 20 are fixedly connected by a rigid connecting means. The rigid connecting means provides a webbing structure that extends at an acute angle to rigidly connect the cylindrical members 18, 20 of the fluid connector assembly 10. The webbing structure 70 provides passageways 72 extending therethrough in order to reduce the weight of the fluid connector assembly 10 while not compromising on the strength of the webbing 70. The webbing structure 70 insures that the longitudinal axis 56 of the cylindrical members 18, 20 are maintained in a substantially parallel relationship so that the conduit members 14, 16 maintain their connection with the tubular ports 28, 30 of the heater core 32. The webbing structure 70 also acts to axially off-set the cylindrical members 18, 20 with respect to one another. Since both the cylindrical members 18, 20 are substantially the same length along their longitudinal axis 56 and since both of the conduit members 14, 16 are substantially the same length along their longitudinal axis 56, the first end 22 of the smaller diameter conduit member 14 will be closer to the heater core 32 than the larger diameter conduit member 16. Therefore, the tubular ports 28, 30 of the heater core 32 are staggered so as to correspond with the off-set axial position of the first ends 22 of conduit members 14, 16. This ensures that the conduit members 14, 16 can only be assembled to the tubular ports 28, 30 of the heater core 32 in one predetermined direction and/or position. Thus, when the fluid connector assembly 10 is being assembled to the heater core 32 or when the fluid connector assembly 10 has been disassembled and then is reassembled to the heater core 32, the fluid connector assembly 10 cannot be incorrectly assembled to the heater core 32.

The webbing structure 70 also helps to radially space the cylindrical members 18, 20 of the fluid connector assembly 10. The cylindrical members 18, 20 are spaced at least the length of the smallest radius of the inside surface of the cylindrical member 20. By insuring a minimum radial distance, the second ends 24 of the conduit members 14, 16 have a greater range of movement without interfering with one another as well as providing more room to service and manipulate the fluid connector assembly 10.

Each of the conduit members 14, 16 has a substantially 90° bend 74 from the first end 22 to the second end 24. The 90° bend 74 allows for adjustment of the second end 24 of the conduit members 14, 16 by rotating the first end 22 of the conduit members 14, 16 within the cylindrical members 18, 20. The 90° bend 74 is provided in a radiused knuckle so as to provide a rounded internal passageway 26.

The conduit members 14, 16 and spacer 12 are all fabricated from a heat resistant polymer. The heat resistant polymer can withstand the high temperatures of engine coolant as well as providing a light-weight, high strength and inexpensive material.

When assembling the fluid connector assembly 10, each of the conduit members 14, 16 are preassembled by having the quick connect 42 portions of the conduit members 14, 16 assembled within the conduit members 14, 16. The conduit members 14, 16 are then assembled into the spacer 12 of the fluid connector assembly 10. Since the two conduit members have a larger and a smaller diameter, there cannot be a mistake as to which conduit member 14, 16 is to be assembled into which cylindrical member 18, 20 of the spacer 12. Thus, the first end 22 of each of the conduit members 14, 16 is inserted through the inside surface of the cylindrical members 18, 20 until the detent means is properly seated. As previously noted, the conduit members 14, 16 can only be assembled to the cylindrical members 18, 20 in one direction. At that point, the 90° bend 74 of the conduit members 14, 16 are free to rotate to the proper position. The fluid connector assembly 10 is then assembled to the tubular ports 28, 30 of the heater core 32. The quick connect portions 42 of the first end 22 of the conduit members 14, 16 are connected to the tubular ports 28, 30 of the heater core 32. The axial off-set positioning of the fluid conduit members 14, 16 assures that the fluid connector assembly 10 can only be connected to the heater core 32 in the proper position. Once the fluid connector assembly 10 is connected to the heater core 32, the flexible tubular hoses 34, 36 may then be fixedly connected to the second ends 24 of the tubular conduits 14, 16. It should be noted that the flexible hoses 34, 36 may first be connected to the second ends of the conduit members 14, 16 prior to the first ends 22 of the conduit members 14, 16 being connected to the tubular ports 28, 30 of the heater core 32. When the heater core 32 is being serviced, first ends 22 of the conduit members 14, 16 may be disconnected from the tubular ports 28, 30 of the heater core 32, and the flexible tubular hoses 24, 36 may remain fixedly attached to the second end 24 of the conduit members 14, 16.

What is claimed is:

1. A spacer for positioning at least two differently sized conduit members with respect to one another for cooperative engagement with a pair of axially off-set, correspondingly sized tubular ports of a motor vehicle heater core, comprising:

at least two means for receiving said at least two differently sized conduit members wherein each of said receiving means has a longitudinal axis and is correspondingly sized to receive said differently sized conduit members; and rigid means for connecting said receiving means wherein said longitudinal axes are substantially parallel, and said receiving means are radially spaced and axially off-set for providing one-way assembly of said conduit members with said correspondingly sized, axially off-set tubular ports of said heater core.

2. The spacer as defined in claim 1 wherein said receiving means further comprises:

detent means for releasably retaining said conduit members in said receiving means.

3. The spacer as defined in claim 2 wherein said detent means comprises:

an annular recess formed in said receiving means; and a complimentary surface on said conduit members wherein said complimentary surface cooperatively engages said annular recess to retain said conduit members within said receiving means.

4. The spacer as defined in claim 3, further comprises:

said annular recess spaced along said longitudinal axis toward one end of said receiving means to provide a one-way assembly of said conduit members to said receiving means.

5. The spacer as defined in claim 1 further comprising:

an annular O-ring seal disposed between said receiving means and said conduit members for preventing the passage of contamination between said receiving means and said conduit members, and said annular O-ring seal aiding in rotational movement of said conduit members about said longitudinal axis.

6. The spacer stated in claim 1, wherein said rigid connecting means and said conduit members are fabricated from a heat resistant polymer.

7. The spacer as defined in claim 1, wherein each of said conduit members further comprise:

a first end and a second end having a central passageway extending therebetween for the passage of fluid;

said first end having a quick connect means for rotatably and releasably retaining said tubular port within said conduit member; and said second end having means for fixedly attaching a tubular member thereto.

8. The spacer as defined in claim 7, wherein each of said conduit members further comprise:

said first and second ends of said conduit members being at substantially right angles with respect to one another.

9. An apparatus, releasably engageable with a pair of axially off-set, differently sized tubular ports of a heater core of a motor vehicle, for directing fluid to and from said heater core in a predetermined spaced relationship comprising:

at least two differently sized conduit members each having a first end and a second end with a central passageway extending therebetween for the passage of fluid;

said first end of each of said conduit members having a quick connect means for rotatably and releasably retaining said tubular members extending from said heater core;

said second end of each of said conduit members having means for fixedly attaching a tubular member thereto;

at least two means for receiving said differently sized conduit members wherein each of said receiving means has a longitudinal axis and are correspondingly sized to receive said differently sized conduit members; and rigid means for connecting said receiving means wherein said longitudinal axes are substantially parallel and said receiving means are radially spaced and axially off-set with respect to one another for providing one-way assembly of said differently sized conduit members with said correspondingly sized axially off-set tubular ports of said heater core.

10. The apparatus as defined in claim 9 wherein each of said conduit members further comprises:

said first and second ends of said conduit members being at substantially right angles relative to one another.

11. The apparatus as defined in claim 9 wherein said receiving means further comprises:

detent means for releasably retaining said conduit members and said receiving means.

12. The apparatus as defined in claim 11 wherein said detent means comprises:

an annular recess formed in said receiving means; and a complimentary surface on said conduit members wherein said complimentary surface cooperatively engages said annular recess to releasably retain said conduit members within said receiving means.

13. The apparatus as defined in claim 12, further comprises:

said annular recess spaced along said longitudinal axis toward one end of said receiving means to provide a one-way assembly of said conduit members to said receiving means.

14. The apparatus as defined in claim 9, further comprising:

an annular O-ring seal disposed between each of said receiving means and said conduit members for preventing the passage of contamination between said receiving means and said conduit members, and said o-ring seals aiding in the rotational movement of said conduit members about said longitudinal axis.

15. The apparatus as stated in claim 9, wherein said rigid connecting means and said conduit members are fabricated from a heat resistant polymer.

16. The apparatus as defined in claim 9, further comprising said conduit receiving means having substantially similar lengths.

17. The apparatus as defined in claim 9, wherein said receiving means are radially spaced by at least the sum of the radii of said receiving means.

18. A fluid connector assembly for directing fluid between a pair of axially off-set, differently sized tubular members extending from a heater core of a motor vehicle, and a pair of flexible tubular members leading to an engine coolant system comprising:

a pair of conduit members each having differently sized inner and outer diameters and each having a first end and a second end with a central passageway extending therebetween for the passage of fluid;

said first end having a quick connect means for rotatably and releasably retaining one of said pair of said tubular members extending from said heater core;

said second end having means for fixedly connecting one of said flexible tubular members thereto;

a spacer having a pair of hollow cylindrical members each having differently sized inner diameters for selectively receiving said correspondingly sized conduit members, and a rigid connector means for fixedly spacing said pair of cylindrical members wherein said cylindrical members have longitudinal axes that are substantially parallel wherein said cylindrical members are radially spaced and axially off-set relative to one another to provide one-way assembly of said differently sized inner diameters of said conduit members with said correspondingly sized, axially off-set tubular members;

said pair of hollow cylindrical members each providing an internal annular recess spaced along said longitudinal axis toward one end of said cylindrical members for receiving a complementary, annular surface extending radially outward from said conduit members to provide one-way assembly of said conduit members to said hollow cylindrical members wherein a predetermined amount of force is required to remove said conduit members from said hollow cylindrical members;

an O-ring seal disposed between said conduit members and said hollow cylindrical members of said spacer to prohibit contamination from passing through said hollow cylindrical members in said spacer and to aid in the rotational movement of said conduit members about said longitudinal axis; and said first end and said second end of said pair of conduit members forming substantially right angles with respect to one another.

19. The fluid connector assembly defined in claim 18, wherein said hollow cylindrical members have substantially the same length.

20. The fluid connector assembly as defined in claim 18, wherein said rigid connecting means and said conduit members are fabricated from a heat resistant polymer.

* * * * *